(12) United States Patent
Von Matern (10) Patent No.: US 11,965,359 B2
(45) Date of Patent: Apr. 23, 2024

(54) ENERGY HARVESTING ARRANGEMENT AND ELECTRONIC LOCKING SYSTEM

(71) Applicant: ASSA ABLOY AB, Stockholm (SE)

(72) Inventor: Johan Von Matern, Täby (SE)

(73) Assignee: ASSA ABLOY AB, Stockholm (SE)

( * ) Notice: Subject to any disclaimer, the term of this patent is extended or adjusted under 35 U.S.C. 154(b) by 885 days.

(21) Appl. No.: 16/970,302

(22) PCT Filed: Feb. 26, 2019

(86) PCT No.: PCT/EP2019/054642
§ 371 (c)(1),
(2) Date: Aug. 14, 2020

(87) PCT Pub. No.: WO2019/166387
PCT Pub. Date: Sep. 6, 2019

(65) Prior Publication Data
US 2021/0079690 A1    Mar. 18, 2021

(30) Foreign Application Priority Data
Mar. 2, 2018   (EP) .................................... 18159643

(51) Int. Cl.
*E05B 47/06*     (2006.01)
*E05B 47/00*     (2006.01)
*H02K 7/18*      (2006.01)

(52) U.S. Cl.
CPC ....... *E05B 47/0603* (2013.01); *H02K 7/1853* (2013.01); *E05B 2047/0062* (2013.01); *E05B 2047/0094* (2013.01); *E05B 47/0673* (2013.01)

(58) Field of Classification Search
CPC ............ E05B 47/0603; E05B 47/0673; E05B 2047/002; E05B 2047/0021;
(Continued)

(56) References Cited

U.S. PATENT DOCUMENTS 4,433,355 A    2/1984  Chew et al.
5,265,452 A *  11/1993 Dawson .............. E05B 47/0012
                                                    70/277
(Continued)

FOREIGN PATENT DOCUMENTS

CN           203640436         6/2014
EP             2765264         8/2014
(Continued)

OTHER PUBLICATIONS

Extended Search Report for European Patent Application No. 18159643.8, dated Jun. 20, 2018, 6 pages.
(Continued)

*Primary Examiner* — Christopher J Boswell
(74) *Attorney, Agent, or Firm* — Schwegman Lundberg & Woessner, P.A.

(57) ABSTRACT

Energy harvesting arrangement (12) for an electronic locking system (116), the energy harvesting arrangement (12) comprising a driven member (32) for driving an electric generator (34), the driven member (32) being arranged to rotate about a driven member rotational axis (74); a drive member (30) movable between a starting position (70), in which the drive member (30) does not engage the driven member (32), and a releasing position (112), in which the drive member (30) can drivingly engage the driven member (32); a harvesting elastic element (40) arranged to force the drive member (30) towards the starting position (70) and arranged to store mechanical energy from displacement of the drive member (30) from the starting position (70); and a release mechanism (42) arranged to release mechanical energy stored in the harvesting elastic element (40) to a returning movable of the drive member (30) from the releasing position (112) to the starting position (70). An electronic locking system (116) is also provided.

15 Claims, 8 Drawing Sheets

(58) Field of Classification Search
CPC ..... E05B 2047/0022; E05B 2047/0062; E05B 2047/0094; H02K 7/1853
See application file for complete search history.

(56) References Cited

U.S. PATENT DOCUMENTS

| | | | | |
|---|---|---|---|---|
| 6,038,895 | A * | 3/2000 | Menke | E05B 47/0611 70/278.1 |
| 6,370,928 | B1 * | 4/2002 | Chies | G07C 9/00309 70/279.1 |
| 8,228,030 | B2 * | 7/2012 | Pukari | E05B 47/063 70/278.2 |
| 8,468,861 | B2 * | 6/2013 | Pukari | G07C 9/00309 70/279.1 |
| 8,866,439 | B2 * | 10/2014 | Pukari | E05B 47/063 70/278.2 |
| 8,899,081 | B2 * | 12/2014 | Pukari | E05B 47/0012 70/283.1 |
| 11,168,493 | B2 * | 11/2021 | Kellokoski | E05B 47/02 |
| 11,286,691 | B2 * | 3/2022 | Kurki | E05B 47/063 |
| 2009/0033100 | A1 | 2/2009 | Dai | |
| 2014/0225375 | A1 | 8/2014 | Chang | |

FOREIGN PATENT DOCUMENTS

| | | |
|---|---|---|
| EP | 3533955 | 9/2019 |
| EP | 3533955 | 11/2020 |
| WO | WO 99/18310 | 4/1999 |
| WO | WO 02/29187 | 4/2002 |
| WO | WO 2013/085057 | 6/2013 |
| WO | WO 2017/142048 | 8/2017 |
| WO | 2019166387 | 9/2019 |

OTHER PUBLICATIONS

International Search Report and Written Opinion for International (PCT) Patent Application No. PCT/EP2019/054642, dated Apr. 26, 2019, 14 pages.
International Preliminary Report on Patentability for International (PCT) Patent Application No. PCT/EP2019/054642, dated Jan. 2, 2020, 17 pages.
Official Action with English Translation for China Patent Application No. 201980015782.7, dated Oct. 11, 2021, 14 pages.
"International Application Serial No. PCT EP2019 054642, Response to Written Opinion filed Oct. 28, 2019 to Written Opinion dated Apr. 26, 2019", 10 pgs.
"European Application Serial No. 18159643.8, Response filed Oct. 28, 2019 to Extended European Search Report dated Jun. 20, 2018", 12 pgs.
"European Application Serial No. 18159643.8, Intention to Grant dated Jun. 24, 2020", 45 pgs.
"180125KR_230712_Office Action", with English translation, (dated Jun. 29, 2023), 10 pages.

* cited by examiner

ENERGY HARVESTING ARRANGEMENT AND ELECTRONIC LOCKING SYSTEM

CROSS REFERENCE TO RELATED APPLICATIONS

This application is a national stage application under 35 U.S.C. 371 and claims the benefit of PCT Application No. PCT/EP2019/054642 having an international filing date of Feb. 26, 2019, which designated the United States, which PCT application claimed the benefit of European Patent Application No. 18159643.8 filed Mar. 2, 2018, the disclosure of each of which are incorporated herein by reference.

TECHNICAL FIELD

The present disclosure generally relates to an energy harvesting arrangement. In particular, an energy harvesting arrangement for an electronic locking system, and an electronic locking system comprising an energy harvesting arrangement, are provided.

BACKGROUND

Various types of electronic locking systems are known. Instead of utilizing a purely mechanical lock, some locking systems include an electronic drive of a lock member (e.g. a lock bolt) to unlock, for example, a door to give access to the area behind the door.

Furthermore, instead of utilizing a traditional key to unlock the door, various types of electronic communication methods for authorizing a person to access the area behind the door are known. For example, a Radio Frequency Identification (RFID) system may be used where a reader of the RFID system is installed in the door and a tag is carried by or attached to an object to be identified.

In order to power an electronic locking system, so called "self-powered" electronic locking systems have been proposed, where electricity is generated by a mechanical actuation of a door handle and is used to power the electronic locking system. This concept is also known as energy harvesting.

US 2014/0225375 A1 discloses a power supply device for a door handle. By turning a door handle to move a latch, a rotation shaft of the door handle is driven to turn a drive gear. The rotation of the drive gear is transmitted to a rotation of a generator shaft to generate power for an electric lock.

SUMMARY

One object of the present disclosure is to provide an energy harvesting arrangement for an electronic locking system, which energy harvesting arrangement enables a relatively high speed of a driven member for driving an electric generator.

A further object of the present disclosure is to provide an energy harvesting arrangement for an electronic locking system, which energy harvesting arrangement has a simple (e.g. with few parts), compact, reliable and/or cheap design.

A still further object of the present disclosure is to provide an energy harvesting arrangement for an electronic locking system, which energy harvesting arrangement has a high efficiency or reduced mechanical losses.

A still further object of the present disclosure is to provide an energy harvesting arrangement for an electronic locking system, which energy harvesting arrangement improves user experience.

A still further object of the present disclosure is to provide an energy harvesting arrangement for an electronic locking system, which energy harvesting arrangement solves several or all of the foregoing objects.

A still further object of the present disclosure is to provide an electronic locking system comprising a lock device, which electronic locking system solves one, several or all of the foregoing objects.

According to one aspect, there is provided an energy harvesting arrangement for an electronic locking system, the energy harvesting arrangement comprising a driven member for driving an electric generator, the driven member being arranged to rotate about a driven member rotational axis; a drive member movable between a starting position, in which the drive member does not engage the driven member, and a releasing position, in which the drive member can drivingly engage the driven member; a harvesting elastic element arranged to force the drive member towards the starting position and arranged to store mechanical energy from displacement of the drive member from the starting position; and a release mechanism arranged to release mechanical energy stored in the harvesting elastic element to a returning movement of the drive member from the releasing position to the starting position.

The drive member may be moved from the starting position to the releasing position by an external force or torque, e.g. by manually turning a handle. The drive member is then released at a certain release position. During the returning movement, the drive member drives the driven member and accelerates for accelerating the electric generator. As the drive member is returned to the starting position after the release, the drive member moves past or "beyond" the driven member. Since the drive member does not engage the driven member in the starting position, the driven member is free to rotate when the drive member has been released and returned to the starting position. All mechanical energy stored by the harvesting elastic element during the displacement from the starting position to the releasing position can thereby be released, in contrast to an energy harvesting arrangement where a drive member is engaged with the driven member in the starting position. The energy harvesting arrangement can thereby accelerate the driven member to a high speed and then let the driven member spin freely with minimum frictional losses. Thus, the efficiency of the energy harvesting arrangement is increased.

The harvesting elastic element may be constituted by a spring, for example an extension spring. Thus, the energy harvesting arrangement according to the present disclosure may be configured to first tension a spring, e.g. by manual rotation of a handle, and then release the spring to accelerate the electric generator.

Although the drive member and the driven member are mainly described as being constituted by gear wheels, the drive member and the driven member may be configured to engage each other in alternative ways, for example by means of friction. Thus, a drive member and a driven member according to the present disclosure may be constituted by friction wheels. Throughout the present disclosure, the driven member may alternatively be referred to as a flywheel.

The present disclosure is however not limited to a rotational movement of the drive member. The drive member may for example alternatively be moved linearly, or substantially linearly, between the starting position and the releasing position. In this case, the drive member may be constituted by, or comprise, a rack for engaging the driven wheel.

The drive member may be moved from the starting position to the releasing position in a first direction (e.g. rotationally or linearly) and the drive member may return from the releasing position to the starting position after release by a movement in a second direction (e.g. rotationally or linearly), opposite to the first direction. The first direction may be referred to as an outbound movement or outbound displacement and the second direction may be referred to as a returning movement or returning displacement. The drive member drivingly engages the driven member during the outbound movement and during the returning movement, except for in positions adjacent to the starting position where the drive member does not engage the driven member.

The drive member may be rotationally movable about a drive member rotational axis between the starting position and the releasing position. The radius of the drive member with respect to the drive member rotational axis may be between two and ten times, such as between three and seven times, such as five times, the radius of the driven member with respect to the driven member rotational axis.

In case the drive member is rotatable about the drive member rotational axis, the releasing position may alternatively be referred to as a releasing angle, i.e. the angle between the starting position and the releasing position about the drive member rotational axis. The releasing angle may vary depending on implementations. The releasing angle may for example be approximately 80° (e.g. for cabinet locks) or approximately 45° (for conventional door handles). Furthermore, when the drive member is rotatable about the drive member rotational axis, both the outbound movement from the starting position and the returning movement are constituted by rotational movements.

The release mechanism is a mechanism configured to release the drive member. The release mechanism may be configured to release the drive member at a specific position of the drive member, i.e. at the releasing position. In case the drive member is rotationally movable about a drive member rotational axis between the starting position and the releasing position, the release mechanism may be configured to release the drive member at a specific rotational position of the drive member, i.e. at the releasing position.

The release mechanism may for example comprise a release member connected to the drive member, and a stationary release member activator, such as a block. In this case, when the drive member has moved from the starting position to the releasing position, the release member can be brought into contact with the release member activator, e.g. by means of a drive pin fixed to an input member, such that the release member activator activates the release member. The activation may be constituted by a push of the release member from an extended position into a retracted position. As a consequence, the engagement between the drive pin and the release member is lost and the release mechanism is released.

The drive member may be constituted by a sector gear, or by a wheel comprising teeth along a sector and no teeth adjacent to the sector. Alternatively, or in addition, the drive member may be flat. The drive member may have largest dimensions in a plane substantially perpendicular to, or perpendicular to, the drive member rotational axis. The drive member may comprise drive teeth; and the driven member may comprise driven teeth for meshing with the drive teeth.

The energy harvesting arrangement according to the present disclosure may further comprise a support device arranged to flexibly support the driven member between a meshing position, in which the driven teeth are positioned for meshing with the drive teeth, and a deflected position, in which the driven member is deflected away from the drive member, when a drive top land (also referred to as tooth crest) of the drive teeth contacts a driven top land of the driven teeth. Thereby, the driven member can deflect to enable the drive member to pass during the movement from the starting position to the releasing position. The support device may alternatively be referred to as a flexible mount, generator mount, or linkage.

If the drive teeth mesh with the driven teeth, the support device does not deflect. However, if the drive teeth do not mesh with the driven teeth, i.e. if a drive top land of the drive teeth mates with a driven top land of the driven teeth, the support device deflects to enable passage of the drive member. The drive teeth and the driven teeth may ride top on top for a little while, but after some further rotation of the drive member, the driven teeth will slide off and be pushed by the support device into mesh with the drive teeth.

The energy harvesting arrangement may be arranged such that a force from the drive member along a force line between the drive member and the driven member during the returning movement of the drive member generates a restoring moment or a restoring force on the support device towards the meshing position. The force line may alternatively be referred to as a line of action. The force line is tangential to the base circles of the drive member and the driven member. Thereby, the driven member is prevented from deflecting due to force from the drive member during the returning movement of the drive member from the releasing position to the starting position, and the support device can be maintained in the meshing position.

Alternatively, or in addition, the support device may comprise a support member for rotationally supporting the driven member, the support member being movable between the meshing position and the deflected position; and a support elastic element arranged to force the support member towards the meshing position. The support member may for example be constituted by a rigid arm.

As an alternative to the support member, the drive teeth and/or the driven teeth may be made to flex in order to facilitate meshing. Alternatively, or in addition, the drive teeth and/or the driven teeth may have a design for facilitating meshing.

The terms "harvesting elastic element" and "support elastic element" are selected to distinguish these two elastic elements. Throughout the present disclosure, the harvesting elastic element may alternatively be referred to as a first elastic element and the support elastic element may alternatively be referred to as a second elastic element.

The support member may be rotationally movable about a support member rotational axis between the meshing position and the deflected position. The support member may thereby pivot or swing to the deflected position. As one alternative, the support member may be arranged to move linearly, or substantially linearly, between the meshing position and the deflected position.

The harvesting elastic element may be preloaded in starting position. In this case, although all mechanical energy from the displacement of the drive member from the starting position to the releasing position can be released, all mechanical energy stored in the harvesting elastic element is not released when the harvesting elastic element is preloaded in the starting position.

As an alternative, the harvesting elastic element could adopt a neutral state when the drive member is in the starting position. In this case, a drive member stop can be dispensed with.

The energy harvesting arrangement according to the present disclosure may further comprise an electric generator arranged to be driven by the driven member. Also the electric generator may be supported by a deflecting support device according to the present disclosure.

The energy harvesting arrangement according to the present disclosure may further comprise a tensioning member and the release mechanism may be constituted by a hold and release mechanism arranged to hold the drive member in the releasing position and arranged to release mechanical energy stored in the harvesting elastic element to the returning movement of the drive member from the releasing position by being actuated by the tensioning member. The tensioning member may alternatively be referred to as an input member. The tensioning member may be connected to, or integrally formed with, a handle. A handle according to the present disclosure may for example be constituted by a handle lever or a knob. The tensioning member may for example be constituted by a tensioning arm.

The hold and release mechanism may comprise a rocker arm rotationally movable about a rocker rotational axis between an extended position, in which the drive member can be held in the releasing position by the rocker arm, and a retracted position, in which the drive member is released from the releasing position; and a rocker elastic element arranged to force the rocker arm towards the extended position. The rocker elastic element may be constituted by a spring, for example a compression spring.

The drive member may comprise a drive structure and the tensioning member may comprise a drive structure engaging part arranged to engage the drive structure of the drive member to move the drive member from the starting position to the releasing position by movement of the tensioning member; and a rocker arm engaging part arranged to engage the rocker arm to move the rocker arm from the extended position to the retracted position.

Furthermore, the rocker arm may comprise a rocker arm engageable profile arranged to be engaged by the drive structure. When the drive structure engages the rocker arm engageable profile, the rocker arm can hold the drive member in the releasing position. The rocker arm engageable profile may for example be constituted by a hook or recess in the rocker arm.

Throughout the present disclosure, the drive structure may be constituted by a pin. The pin may extend substantially perpendicular to, or perpendicular to, a plane of the drive member. Alternatively, or in addition, the pin may extend substantially parallel to, or parallel to, the drive member rotational axis.

The tensioning member and the hold and release mechanism may be configured such that the drive member is positioned in the releasing position near the end of, or at the end of, an outbound rotation of the tensioning member in a first direction and such that the tensioning member actuates the hold and release mechanism to release during a return rotation of the tensioning member in a second direction, opposite to the first direction. Near the end of the outbound position may be at least 90%, such as at least 95%, of an angular range of the outbound rotation of the tensioning member in the first direction.

According to a further aspect, there is provided a lock device comprising an energy harvesting arrangement according to the present disclosure. The lock device may comprise an input member and a handle connected to, or integrally formed with, the input member. The input member may be constituted by a handle shaft and/or a tensioning member. The energy harvesting arrangement may thus be configured to convert energy from rotation of the handle into electrical energy.

Alternatively, or in addition, the lock device may further comprise an output member and a latch connected to, or integrally formed with, the output member. The output member may be constituted by a latch shaft.

According to a further aspect, there is provided an electronic locking system comprising an energy harvesting arrangement according to the present disclosure.

According to a further aspect, there is provided an electronic locking system comprising a lock device according to the present disclosure.

According to a further aspect, there is provided a method for operating an energy harvesting arrangement of an electronic locking system, the method comprising manually moving a drive member for an electric generator, directly or indirectly, from a starting position, in which the drive member does not engage a driven member, to a releasing position, in which the drive member can drivingly engage the driven member, against the force from a harvesting elastic element arranged to force the drive member towards the starting position and arranged to store mechanical energy from displacement of the drive member from the starting position; and releasing mechanical energy stored in the harvesting elastic element to a returning movement of the drive member from the releasing position to the starting position.

BRIEF DESCRIPTION OF THE DRAWINGS

Further details, advantages and aspects of the present disclosure will become apparent from the following embodiments taken in conjunction with the drawings, wherein.

DETAILED DESCRIPTION

In the following, an energy harvesting arrangement for an electronic locking system, and an electronic locking system comprising an energy harvesting arrangement, will be described. The same reference numerals will be used to denote the same or similar structural features.

Figure 1:
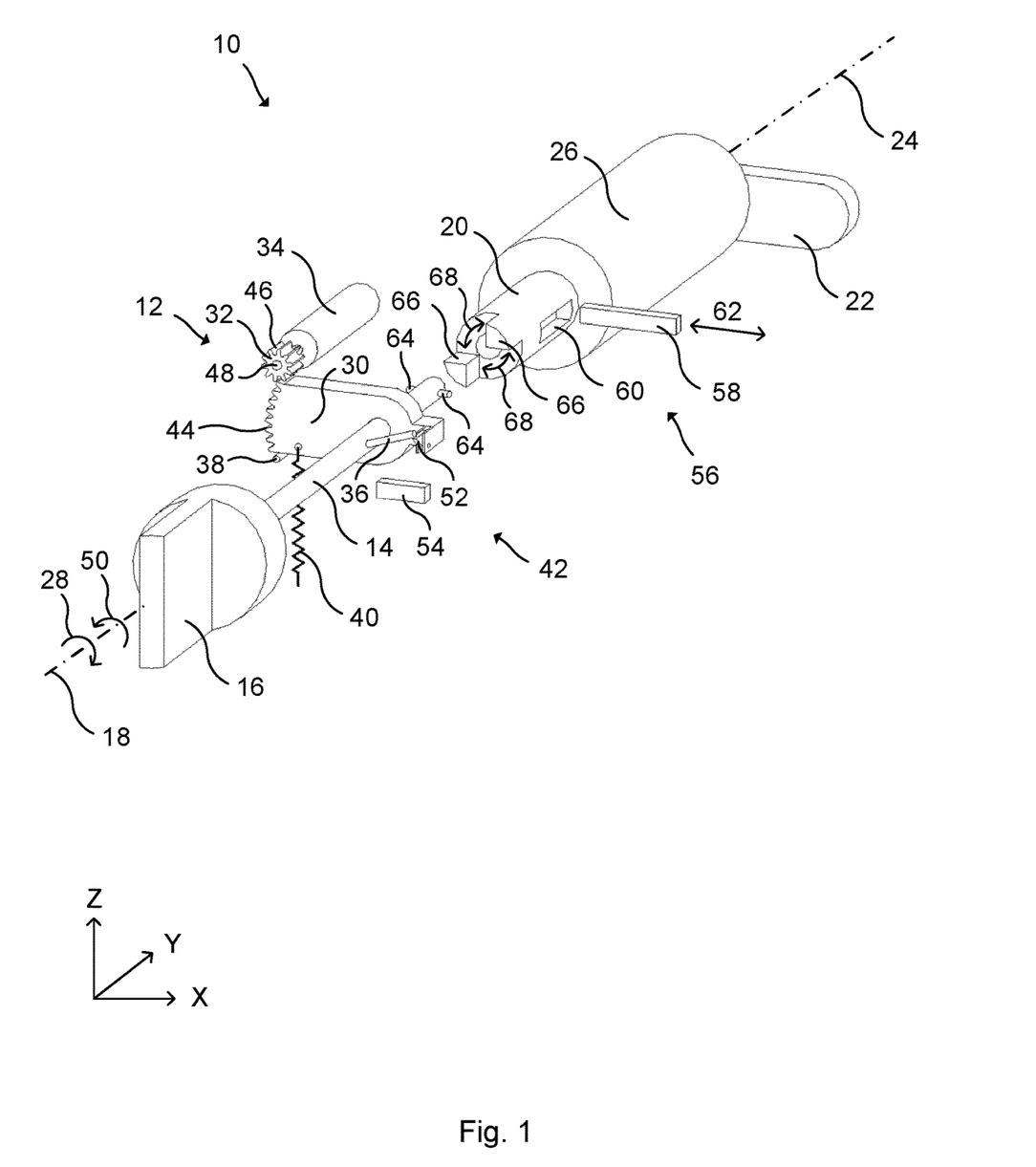
FIG. 1: schematically represents a perspective view of a lock device comprising an energy harvesting arrangement.

FIG. 1 schematically represents a perspective view of one example of a lock device 10 comprising one example of an energy harvesting arrangement 12 according to the present disclosure for an electronic locking system. The lock device 10 of this example comprises an input member 14, here constituted by a handle shaft, and a handle 16, here constituted by a knob, fixedly connected to the input member 14 and for manually maneuvering the input member 14. The input member 14 is arranged to rotate about an input rotational axis 18. The lock device 10 in FIG. 1 may for example be used for a cabinet lock.

The lock device 10 of the example in FIG. 1 further comprises an output member 20, here constituted by a latch shaft, and a latch 22 fixedly connected to the output member 20. The output member 20 is arranged to rotate about an output rotational axis 24. In the example in FIG. 1, the output rotational axis 24 is concentric with the input rotational axis 18 but this relationship may be different, e.g. including inclined or offset relationships. The output member 20 is supported for rotation about the output rotational axis 24 by means of a bearing device 26.

The energy harvesting arrangement 12 of this example is configured to harvest energy from rotation of the input member 14 in a first direction 28 about the input rotational axis 18. The present disclosure is not limited to the type of energy harvesting arrangement 12 in FIG. 1.

The energy harvesting arrangement 12 of the example in FIG. 1 comprises a drive member 30, a driven member 32, an electric generator 34, a drive pin 36, a drive member stop 38, a harvesting elastic element 40 and a release mechanism 42. The drive member 30 is here constituted by a rigid piece arranged to rotate relative to the input member 14 about the input rotational axis 18. The drive member 30 comprises drive teeth 44 for driving driven teeth 46 of the driven member 32, here implemented as a gear wheel. The driven member 32 is arranged to drive the electric generator 34. In this example, the driven member 32 is coupled to a shaft 48 of the electric generator 34. The drive pin 36 is fixed to the input member 14.

The harvesting elastic element 40 is here implemented as a tension spring. In the state of the energy harvesting arrangement 12 illustrated in FIG. 1, i.e. in the starting position of the drive member 30, the harvesting elastic element 40 is tensioned, i.e. preloaded, and rotationally forces the drive member 30 in a second direction 50, opposite to the first direction 28, about the input rotational axis 18 against the drive member stop 38. The tension in the harvesting elastic element 40 increases as the drive member 30 is displaced by rotation in the first direction 28 about the input rotational axis 18.

The drive member stop 38 in FIG. 1 is exemplified by a stop pin. The drive member stop 38 may however be constituted by alternative stopping structures. As a further alternative, the drive member stop 38 may be removed and the drive member 30 can be positioned in the position illustrated in FIG. 1 by a resting position (i.e. in an unloaded state) of the harvesting elastic element 40.

The release mechanism 42 of the example in FIG. 1 comprises a release member 52 connected to the drive member 30 and a stationary release member activator 54, here exemplified as a block. The release member 52 is rotatable about a hinge between an extended position (as illustrated in FIG. 1) and a retracted position. The release mechanism 42 in FIG. 1 is however only one example of a release mechanism according to the present disclosure.

The lock device 10 of the example in FIG. 1 further comprises a transfer device 56. The transfer device 56 can be selectively moved, e.g. based on a granted access control procedure, from a locking state, in which the output member 20 cannot be rotated about the output rotational axis 24 by means of rotation of the input member 14 about the input rotational axis 18, and an unlocking state, in which the output member 20 can be rotated about the output rotational axis 24 by means of rotation of the input member 14 about the input rotational axis 18. The transfer device 56 is powered by the energy harvesting arrangement 12, either directly or indirectly, e.g. via a power storage (not shown) such as a capacitor or supercapacitor.

In the example in FIG. 1, the transfer device 56 is constituted by a Mocking device 58. The locking state of the transfer device 56 is constituted by a Mocking state of the Mocking device 58 and the unlocking state of the transfer device 56 is constituted by an unblocking state of the Mocking device 58 (as illustrated in FIG. 1).

Various types of alternative transfer devices exist. Furthermore, a Mocking device according to the present disclosure is not limited to the type in FIG. 1. Rather, the Mocking device 58 in FIG. 1 merely constitutes one of numerous examples of blocking devices according to the present disclosure. In FIG. 1, the blocking device 58 is arranged to move into a recess 6o in the output member 20 to adopt the blocking state and to move out from the recess 6o to adopt the unblocking state. Movements of the blocking device 58 are illustrated by arrow 62. An actuator (not shown) may be used to drive the Mocking device 58 between the Mocking state and the unblocking state.

In the example in FIG. 1, the input member 14 comprises an engaging structure 64 and the output member 20 comprises an engageable structure 66 arranged to be engaged by the engaging structure 64. In FIG. 1, the engaging structure 64 is arranged at the distal end of the input member 14 and the engageable structure 66 is arranged at the proximal end of the output member 20. However, the engaging structure 64 and/or the engageable structure 66 may be arranged at alternative locations, e.g. not necessarily distal/proximal. Furthermore, in FIG. 1, the input member 14 is distanced from the output member 20 to facilitate the view of the engaging structure 64 and the engageable structure 66.

The engaging structure 64 is here exemplified as two engaging protrusions and the engageable structure 66 is here exemplified as two engageable protrusions. Each engaging protrusion is constituted by a pin extending radially with respect to the input rotational axis 18. Each engageable protrusion is constituted by a stop extending parallel to the output rotational axis 24.

The engaging structure 64 and the engageable structure 66 define an angular clearance 68 or sector through which engaging structure 64 can rotate about the input rotational axis 18 before the engageable structure 66 is engaged. In the example of FIG. 1, the angular clearance 68 is 90°. However, the angular clearance 68 can be made either larger or smaller.

In FIG. 1, the input member 14 is positioned in a starting position or in a neutral position. FIG. 1 further denotes a vertical axis Z and two horizontal axes X and Y for referencing purposes. In FIG. 1, the lock device 10 is generally horizontally oriented. However, the lock device 10 may be oriented arbitrarily in space.

One example of a method of operating the lock device 10 in FIG. 1 will now be described. When the Mocking device 58 is positioned in the Mocking state, the output member 20 is blocked from rotating about the output rotational axis 24. However, the input member 14 may be rotated 90° about the input rotational axis 18, e.g. such that the engaging structure 64 rotates through the angular clearance 68, when the blocking device 58 is positioned in the blocking state. The input member 14 can therefore always be rotated 90°, and energy from this rotation can always be harvested by the energy harvesting arrangement 12, regardless of the state adopted by the blocking device 58.

Moreover, when the drive member 30 is in the illustrated starting position, the drive member 30 does not engage the driven member 32. More specifically, in the starting position of the drive member 30, the drive teeth 44 are moved away from the driven teeth 46 such that the driven member 32 is free to rotate about a driven member rotational axis (not shown).

By manually rotating the input member 14 in the first direction 28 about the input rotational axis 18, e.g. by manually grabbing and turning the handle 16, the drive pin 36 pushes the release member 52, which is in the extended position, such that the drive member 30 rotates in the first direction 28 about the input rotational axis 18 from a starting position. The rotation of the drive member 30 is counteracted by the harvesting elastic element 40.

As the drive member 30 is initially rotated in the first direction 28 about the input rotational axis 18, the electric generator 34 is driven via the drive teeth 44, the driven teeth 46 and the driven member 32. The energy generated by the electric generator 34 during this initial rotation may be used to wake up and perform an access control procedure of an access control device (described in FIG. 4), for example by means of BLE communication. The drive member 30 is movable between a starting position, in which the drive member 30 does not engage the driven member 32, and a releasing position, in which the drive member 30 can drivingly engage the driven member 32.

When the input member 14 has rotated further in the first direction 28 about the input rotational axis 18, such as approximately 80° from the starting position to the releasing position, the release member 52 is brought into contact with the release member activator 54 and the release member activator 54 pushes the release member 52 from the extended position into a retracted position. As a consequence, the engagement between the drive pin 36 and the release member 52 is lost and the release mechanism 42 is released. Thus, in this example, the releasing angle is approximately 80°. However, the releasing angle may be arbitrarily set depending on the desired user experience and/or the amount of energy to be harvested. For example, in a door handle, the releasing angle may be set to approximately 45°.

Upon release, the harvesting elastic element 40 pulls the drive member 30 to rotate in the second direction 50 about the input rotational axis 18, i.e. a returning movement, which generates a relatively fast rotation of the driven member 32. The drive member 30 is then stopped by the drive member stop 38 (or when the harvesting elastic element 40 adopts the resting position) in the starting position where the drive member 30 again does not engage the driven member 32. The driven member 32 is thereby free to rotate until the rotation fades out. A relatively high amount of energy is thereby harvested by the energy harvesting arrangement 12.

If the access control procedure results in granted access, the Mocking device 58 is moved from the Mocking state to the unblocking state, e.g. by means of the energy collected by the release of the release mechanism 42, or by means of energy collected by one or more earlier releases of the release mechanism 42. The energy harvested by the energy harvesting arrangement 12 during the release of the release mechanism 42 may be sufficient to move the Mocking device 58 from the Mocking state to the unblocking state, and back to the blocking state. A part of the harvested energy may also be stored and used for one or more subsequent movements of the blocking device 58 from the Mocking state to the unblocking state, and back to the Mocking state.

For a cabinet lock, the energy harvested by the energy harvesting arrangement 12 during the release of the release mechanism 42 may be just a little bit more than required to move the Mocking device 58 from the Mocking state to the unblocking state, and back to the blocking state. According to one variant, e.g. in a cabinet lock, the excess energy may be stored and used to wake up an access control device and to unblock the Mocking device 58 during a subsequent passage. The energy harvested during the subsequent passage may be used to block the blocking device 58 after the subsequent passage.

For some implementations, such as door handles, a relatively large power storage may be used. The energy harvesting arrangement 12 may in this case repetitively charge the power storage such that the power storage remains substantially fully charged. In this case, the blocking device 58 may be moved from the blocking state to the unblocking state before rotation of the handle 16. The energy harvested can thereby be used for a later passage.

When the input member 14 has rotated 90° in the first direction 28 about the input rotational axis 18, the engaging structure 64 of the input member 14 starts to engage the engageable structure 66 of the output member 20. That is, the engaging structure 64 is brought into contact with the engageable structure 66. Since the Mocking device 58 now adopts the unblocking state, further rotation of the input member 14 in the first direction 28 about the input rotational axis 18, for example from 90° to 180°, causes the output member 20, and consequently the latch 22 to be rotated. In this way, the lock device 10 can be unlocked.

If the lock device 10 is to be locked again, the input member 14 is rotated in the second direction 50 about the input rotational axis 18. During the initial returning rotation, e.g. from 180° from the starting position to 90° from the starting position, the engaging structure 64 of the input member 14 moves through the angular clearance 68. During the subsequent returning rotation, e.g. from 90° from the starting position to the starting position, the output member 20, and consequently the latch 22, is rotated together with the input member 14. Just prior to returning to the starting position, the drive pin 36 rides over the release member 52 such that the drive member 30 can be rotated again. In other words, the energy harvesting arrangement 12 is reset. Once it is determined that the latch 22 has been locked again, for example by means of a position sensor (not shown) reading a value indicative of the position of the latch 22 or of the input member 14, the blocking device 58 is moved from the unblocking state back to the Mocking state. In cases where the blocking device 58 comprises, for example, a spring loaded actuator pin for engaging the recess 60, movement of the blocking device 58 from the unblocking state to the Mocking state can be actuated earlier such that the actuator pin "jumps" into the recess 60 when the output member 20 is rotationally aligned with the blocking device 58.

FIGS. 2a-2e schematically represent a further example of an energy harvesting arrangement 12 according to the present disclosure in different states. Mainly differences with respect to the energy harvesting arrangement 12 in FIG. 1 will be described.

Figure 2A:
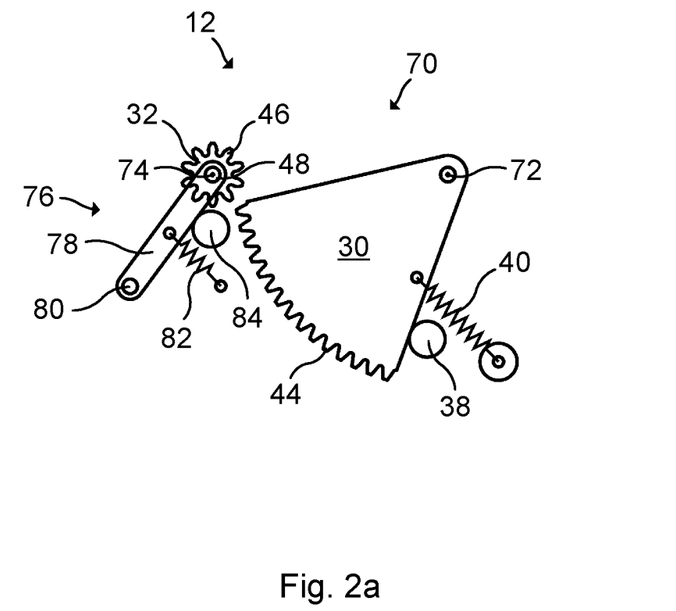
FIGS. 2a-2e: schematically represent a further energy harvesting arrangement in different states.

FIG. 2a shows the drive member 30 in a starting position 70. In FIG. 2a, all parts of the energy harvesting arrangement 12 are at rest. The drive member in FIG. 2a may be driven by an input member 14 and/or a handle 16 in the same way as described in connection with FIG. 1. The energy harvesting arrangement 12 in FIG. 2a also comprises a release mechanism (not shown). The release mechanism may be of the type in FIG. 1 or of any other type according to the present disclosure.

In the example in FIG. 2a, the drive member 30 is rotationally movable about a drive member rotational axis 72 between the starting position 70 in FIG. 2a and a releasing position. In this example, the drive member rotational axis 72 is concentric with an input rotational axis 18 of an input member 14 according to FIG. 1. Movements of the drive member 30 between the starting position 70 and the releasing position according to the present disclosure are not limited to rotational movements. Linear, or substantially linear, movements may alternatively be employed. In this case, the drive member may comprise, or be constituted by, a rack. Furthermore, the drive member rotational axis 72 does not have to be concentric with the input rotational axis 18 of the input member 14.

The driven member 32 in FIG. 2a is rotatable about a driven member rotational axis 74. A radius of the drive member 30 with respect to the drive member rotational axis 72 (i.e. a distance between the drive member rotational axis 72 and the drive teeth 44) is approximately five times a radius of the driven member 32 with respect to the driven member rotational axis 74 (i.e. a distance between the driven member rotational axis 74 and the driven teeth 46). The present disclosure is however not limited to this particular relationship of radiuses.

In the example of FIG. 2a, the drive member 30 is constituted by a sector gear. The angular extension of the sector gear (with respect to the drive member rotational axis 72) is approximately 60° in this example.

As can be seen in FIG. 2a, the drive member 30 does not engage the driven member 32 in the starting position 70. Although the drive member 30 and the driven member 32 are separated, the drive member 30 is rather close to the driven member 32. In this example, the drive member 30 is separated from the driven member 32 by an angular distance, with respect to a drive member rotational axis 72, of approximately 10°. This angular distance may be between 1° and 20°, such as between 1° and 10°.

The harvesting elastic element 40 of this example is constituted by a tension spring that is preloaded. The harvesting elastic element 40 thereby pulls the drive member 30 against the drive member stop 38 and holds the drive member 30 in the starting position 70 according to FIG. 2a. The harvesting elastic element 40 does however not need to be preloaded in the starting position 70 of the drive member 30.

The energy harvesting arrangement 12 according to the example in FIG. 2a further comprises a support device 76. The support device 76 is arranged to flexibly support the driven member 32 between a meshing position and a deflected position. In FIG. 2a, the support device 76 is in the meshing position. In the meshing position, the driven member 32 is positioned such that the driven teeth 46 can be engaged by the drive teeth 44 when the drive member 30 has rotated a bit from the starting position 70.

The support device 76 of the example in FIG. 2a comprises a support member 78, here implemented as a rigid arm, for rotationally supporting the driven member 32 for rotation about the driven member rotational axis 74. The support member 78 is hinged to rotate about a support member rotational axis 80. The support member 78 is thereby rotationally movable about the support member rotational axis 8o between the meshing position and the deflected position.

The support device 76 of this example further comprises a support elastic element 82, here implemented as a tension spring, arranged to force the support member 78 towards a support member stop 84, here implemented as a support member stop pin. The support member stop 84 thus defines the meshing position of the support member 78, and consequently also of the support device 76.

Figure 2B:
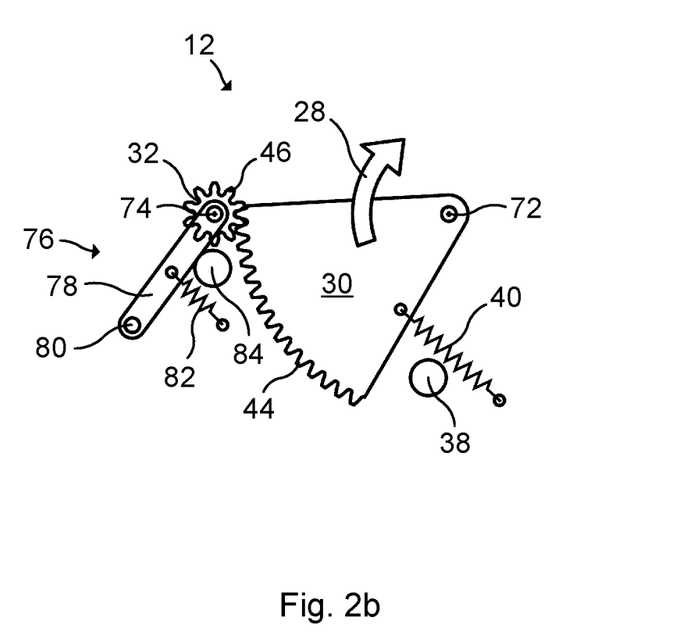

With reference to FIGS. 2a-2e, one example of operating the energy harvesting arrangement 12 will now be described. When the input member 14 is rotated in a first direction 28 about the input rotational axis 18, for example by manually rotating a handle 16 as shown in FIG. 1, an external torque is applied to the drive member 30. The drive member 30 thereby starts to rotate in the first direction 28 about the drive member rotational axis 72 as shown in FIG. 2b. This rotation may be referred to as an outbound rotation, outbound movement or outbound displacement. In FIG. 2b, the drive teeth 44 are meshing with the driven teeth 46. Thus, the support device 76 remains in the meshing position. As the drive member 30 rotates in the first direction 28 about the drive member rotational axis 72, the harvesting elastic element 40 is tensioned more.

However, when the drive member 30 starts to be moved from the starting position 70, there is a risk that a drive top land (not denoted) of the drive teeth 44 contacts a driven top land (not denoted) of the driven teeth 46. Such collision between top lands could block the drive member 30 from rotating. If this happens, the rotation of the drive member 30 will cause the drive top land to push the driven top land such that the support device 76 moves away from the meshing position, i.e. to the deflected position. When the support device 76 adopts the deflected position, the drive member 30 may continue to rotate. Due to the force from the support elastic element 82 on the support member 78, the driven teeth 46 are pushed against the drive teeth 44. The drive teeth 44 and the driven teeth 46 will therefore eventually adopt a meshing state as the drive member 30 continues to rotate and the support device 76 will adopt the meshing position.

Energy from the rotation of the driven member 32 during the rotation of the drive member 30 in the first direction 28 about the drive member rotational axis 72 according to FIG. 2b is harvested by the electric generator 34. This energy may be used to wake up an access control device, such as a BLE (Bluetooth Low Energy).

Figure 2C:
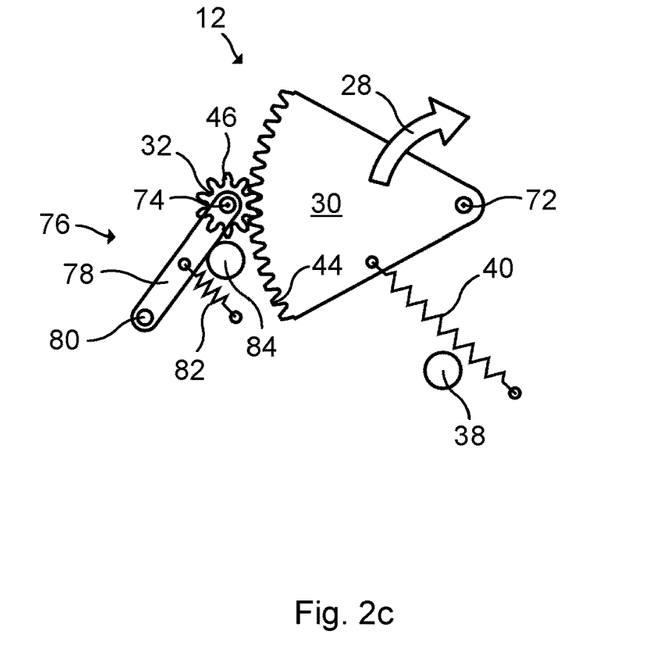

FIG. 2c shows the energy harvesting arrangement 12 in a state where the drive member 30 has been rotated further in the first direction 28 about the drive member rotational axis 72. In FIG. 2c, the drive member 30 is close to the releasing position. The release position in FIGS. 2a-2e may be approximately 45° from the starting position 70, or at other arbitrary angles.

Figure 2D:
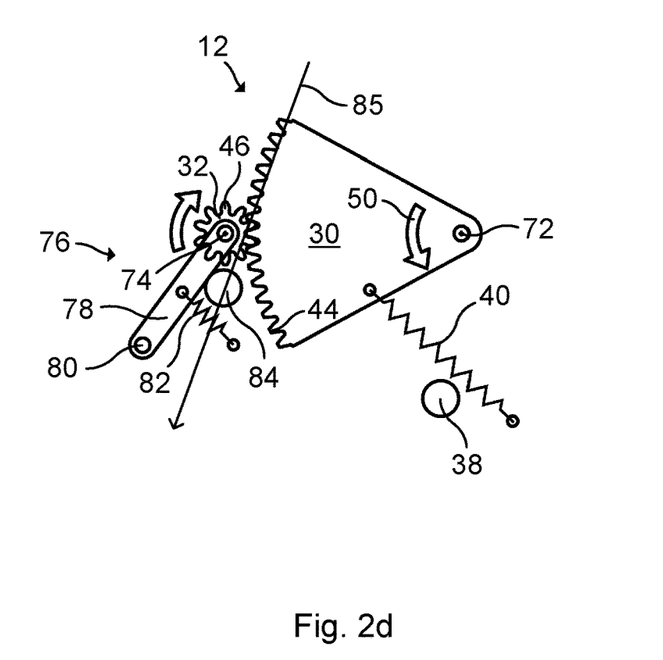

FIG. 2d shows the energy harvesting arrangement 12 in a state just after release of the release mechanism 42. The drive member 30 and the driven member 32 now rapidly accelerate, driven by the force from the harvesting elastic element 40. The drive member 30 now rotates in the second direction 50 about the drive member rotational axis 72. As the drive member 30 drives the driven member 32 after release, the drive member 30 has a lower rotational speed than the driven member 32, in this case approximately five times lower. This increases the efficiency of the energy harvesting arrangement 12. The gear ratio may be optimized depending on the electric generator 34 used.

FIG. 2d further shows that a force from the drive member 30 along a force line 85 between the drive member 30 and the driven member 32 during the returning rotation of the drive member 30 generates a restoring moment (clockwise about the support member rotational axis 20 in FIG. 2d) on the support device 76 towards the meshing position. Thereby, the driven member 32 is prevented from deflecting due to the force from the drive member 30 during the returning rotation.

Figure 2E:
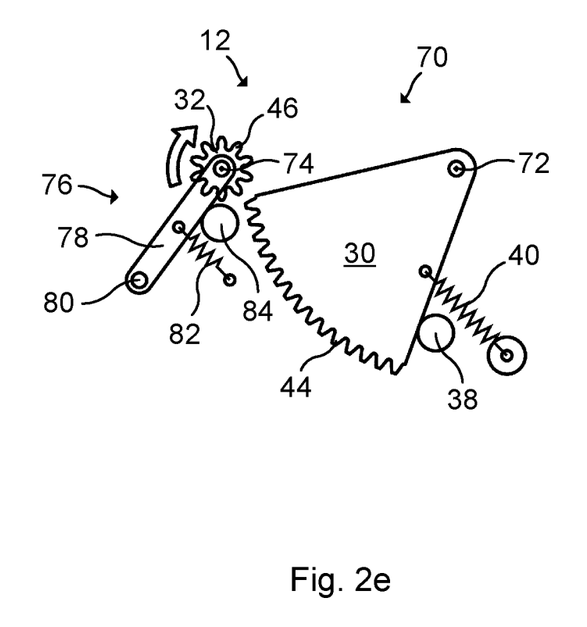

FIG. 2e shows the energy harvesting arrangement 12 in a state when the drive member 30 has returned to the starting position 70. Kinetic losses can be reduced since the drive member 30 moves past the driven member 32. The drive teeth 44 are moved out from engagement with the driven teeth 46 and are no longer interacting. Therefore, the driven member 32 can spin freely until the rotation fades out. The returning rotation by the drive member 30 is limited by the drive member stop 38.

FIGS. 3a-3e schematically represent a further example of an energy harvesting arrangement 12 according to the present disclosure in different states. Mainly differences with respect to FIGS. 1 and 2 will be described. The energy harvesting arrangement 12 according to FIGS. 3a-3e may also comprise a support device 76 according to FIGS. 2a-2e.

Figure 3A:
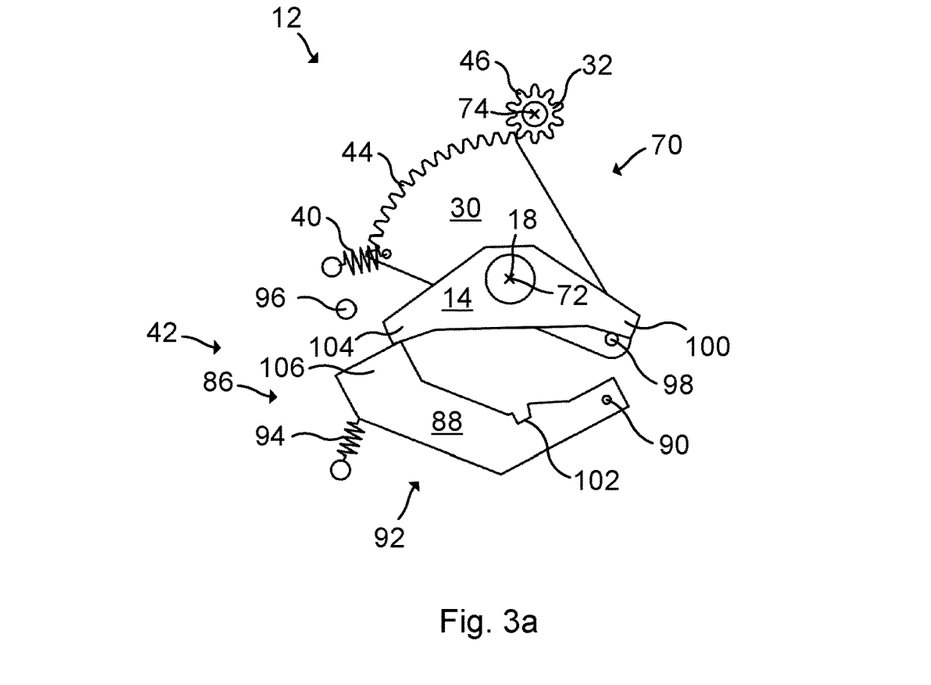
FIGS. 3a-3e: schematically represent a further energy harvesting arrangement in different states.

With reference to FIG. 3a, the energy harvesting arrangement 12 of this example comprises a tensioning member 14, here implemented as a tensioning arm. The tensioning member 14 may be connected to a handle 16 and may thus constitute an input member. In FIG. 3a, the release mechanism 42 is constituted by a hold and release mechanism 86, i.e. a mechanism that is both configured to hold the drive member 30 and configured to release the drive member 30. The hold and release mechanism 86 is arranged to hold the drive member 30 in a releasing position. The hold and release mechanism 86 is also arranged to release mechanical energy stored in the harvesting elastic element 40 to the returning movement of the drive member 30 from the releasing position, when being actuated by the tensioning member 14.

The hold and release mechanism 86 of the example in FIG. 3a comprises a rocker arm 88. The rocker arm 88 is hinged to rotate about a rocker rotational axis 90 between a retracted position 92 and an extended position. In FIG. 3a, the rocker arm 88 is in the retracted position 92. The hold and release mechanism 86 of this example further comprises a rocker elastic element 94, here implemented as a compression spring. The rocker elastic element 94 pushes the rocker arm 88 from the retracted position 92 according to FIG. 3a towards an extended position. The hold and release mechanism 86 of this example further comprises an optional rocker arm stop 96 for stopping the rocker arm 88. The rocker arm stop 96 thus defines the extended position of the rocker arm 88.

In the example of FIG. 3a, the drive member 30 comprises a drive structure 98 and the tensioning member 14 comprises a drive structure engaging part 100. The drive structure engaging part 100 is arranged to engage the drive structure 98 and to move the drive member 30 from the starting position 70 to the releasing position by rotating the tensioning member 14 about the input rotational axis 18. Also in the example of FIGS. 3a to 3e, the input rotational axis 18 is concentric with the drive member rotational axis 72.

In FIG. 3a, the drive structure 98 is constituted by a pin extending from the drive member 30 and the drive structure engaging part 100 is constituted by an end of the tensioning member 14. However, the drive structure 98 and the drive structure engaging part 100 may be of any type to transmit a rotation of the tensioning member 14 to a rotation of the drive member 30, or to a translational movement of the drive member 30 in alternative variants.

The tensioning member 14 of the example in FIG. 3a comprises a rocker arm engageable profile 102, here implemented as a recess, for receiving the drive structure 98. The tensioning member 14 further comprises a rocker arm engaging part 104 for engaging a rocker arm engageable part 106 of the rocker arm 88, here constituted by an end of the rocker arm 88. In this example, the rocker arm engaging part 104 is constituted by an end of the tensioning member 14 and the rocker arm engageable part 106 is constituted by an end of the rocker arm 88. The engagement between the rocker arm engaging part 104 and the rocker arm engageable part 106 causes the rocker elastic element 94 to be compressed and the rocker arm 88 to be held in the retracted position 92.

One example of operating the energy harvesting arrangement 12 in FIGS. 3a-3e will now be described. FIG. 3a illustrates the drive member 30 in the starting position 7o. In FIG. 3a, all parts are at rest. The rocker arm engaging part 104 of the tensioning member 14 is in contact with the rocker arm engageable part 106 of the rocker arm 88. The drive structure engaging part 100 of the tensioning member 14 is in contact with the drive structure 98 of the drive member 30 and is ready to tension the harvesting elastic element 40.

Figure 3B:
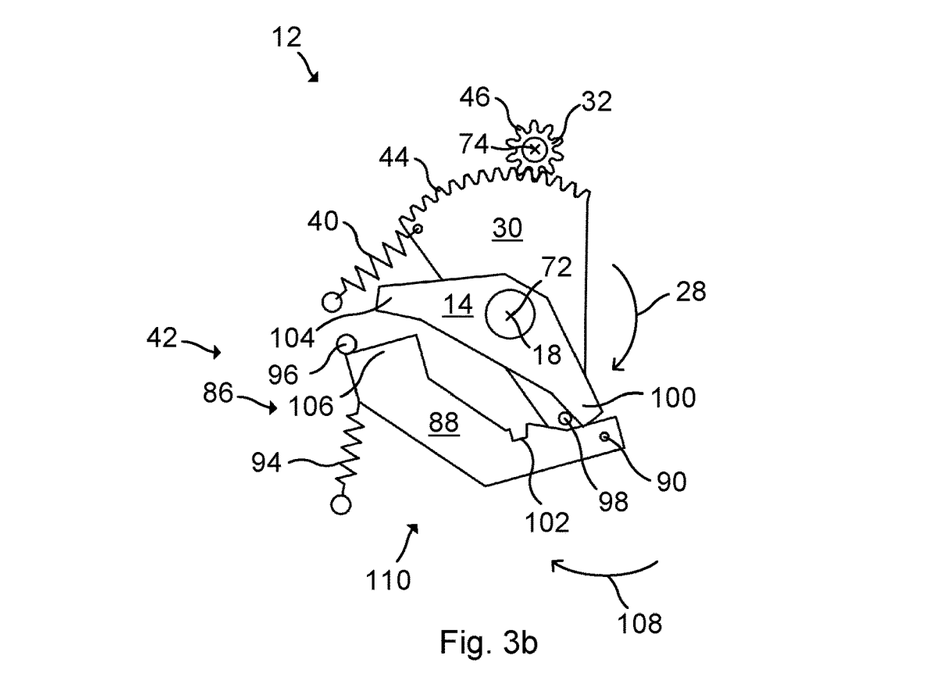

FIG. 3b illustrates that by applying an external torque to the tensioning member 14, e.g. by manually turning the handle 16, the tensioning member 14 is rotated in the first direction 28 about the input rotational axis 18. Since the drive structure engaging part 100 engages the drive structure 98, this rotation of the tensioning member 14 causes the drive member 30 to rotate in the first direction 28 about the drive member rotational axis 72 (and about the concentric input rotational axis 18). Consequently, the harvesting elastic element 40 is tensioned.

During this outbound rotation of the tensioning member 14, the rocker arm 88 initially rotates in a first rotational direction 108 about the rocker rotational axis 90 due to the force from the rocker elastic element 94. When the rocker arm engageable part 106 contacts the rocker arm stop 96, further rotation of the tensioning member 14 causes the engagement between the rocker arm engaging part 104 and the rocker arm engageable part 106 to be lost. The rocker arm 88 is thereby stopped in the extended position no as shown in FIG. 3b.

Figure 3C:
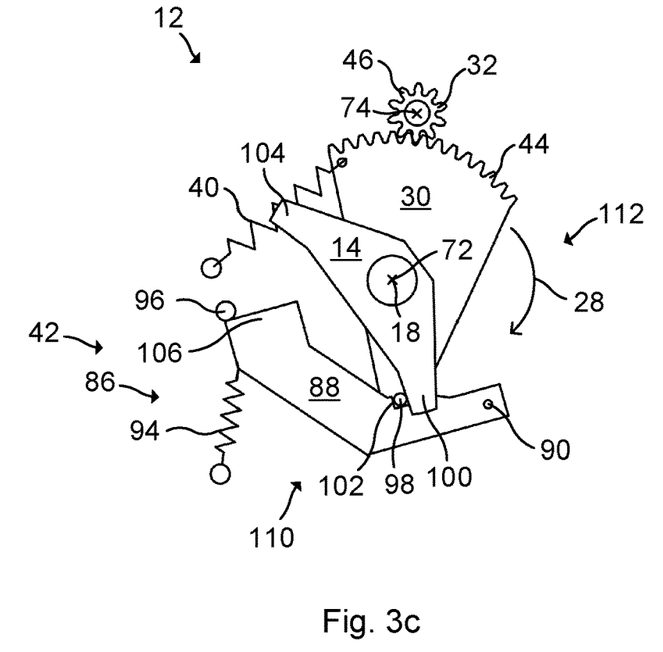

FIG. 3c shows a state of the energy harvesting arrangement 12 where the tensioning member 14 has been rotated further about the input rotational axis 18. The harvesting elastic element 40 has been tensioned more by the further rotation of the drive member 30 due to the engagement between the drive structure engaging part 100 and the drive structure 98, such that more mechanical energy has been stored in the harvesting elastic element 40. The drive member 30 has been moved into a releasing position 112.

In the rotational position of the tensioning member 14 in FIG. 3c, the drive structure 98 is received in, and engages, the rocker arm engageable profile 102. Thereby, the hold and release mechanism 86 holds the drive member 30 in the releasing position 112. This state may also block the tensioning member 14 from further rotation. The tensioning member 14 can now be rotated in the second direction 50 while the drive member 30 stays in the releasing position 112. The angular distance of the drive member 30 in the first direction 28 about the input rotational axis 18 between the states in FIGS. 3a and 3c is approximately 45°, but could be either larger or smaller.

Figure 3D:
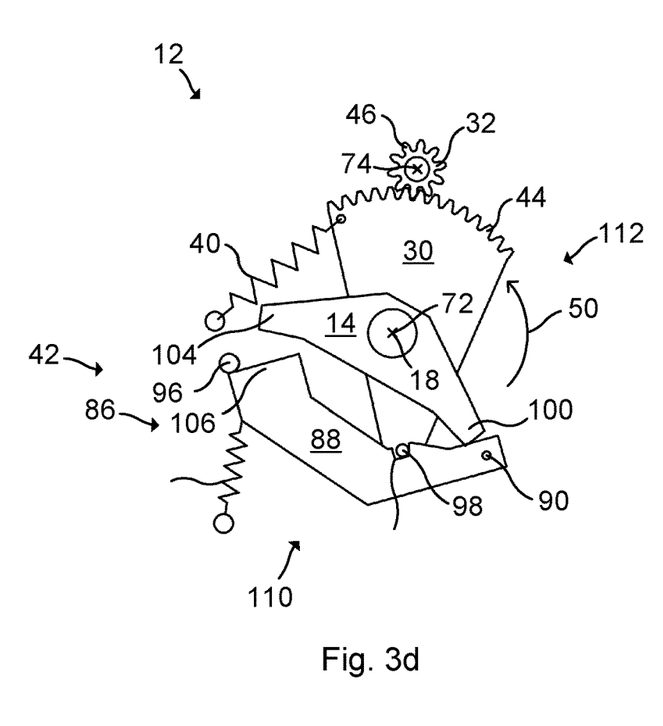

FIG. 3d shows a state of the energy harvesting arrangement 12 where the tensioning member 14 has initiated a return movement, i.e. a rotation of the tensioning member 14 in the second direction 50 about the input rotational axis 18. During the return movement, the tensioning member 14 rotates while the drive member 30 is held in the releasing position 112. The releasing position 112 in FIGS. 3a-3e is thereby "moved" in comparison with FIGS. 1 and 2. That is, the release is set to be triggered at a different rotational position of the handle 16.

Figure 3E:
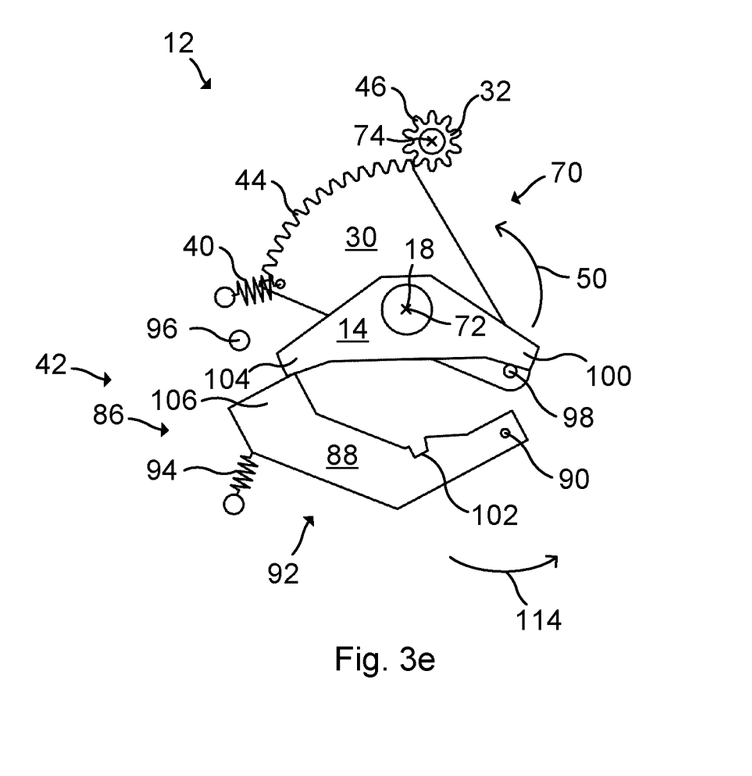

As the return movement of the tensioning member 14 continues, the rocker arm engaging part 104 engages, or actuates, the rocker arm engageable part 106. FIG. 3e shows that as the tensioning member 14 is rotated further, the engagement between the rocker arm engaging part 104 and the rocker arm engageable part 106 causes the rocker arm 88 to rotate in a second direction 114 about the rocker rotational axis 90 against the compression of the rocker elastic element 94. Due to this rotation of the rocker arm 88, the rocker arm engageable profile 102 is moved away from the drive structure 98 and the engagement therebetween is lost. As a consequence, the drive member 30 is released and rotated back to the start position. Similarly to FIGS. 1 and 2, energy from the returning movement of the drive member 30 can be harvested by the electric generator 34.

In contrast to FIGS. 1 and 2, the energy harvesting arrangement 12 according to FIGS. 3*a*-3*e* thereby generates a release during the return movement of the tensioning member 14, and during a return movement of the handle 16 connected to the tensioning member 14. The operator does thereby not feel the release at the bottom of the opening movement. Instead, the release is felt during the return movement. This may improve the user experience. Thus, the energy collection movement (outbound movement) is the same in FIGS. 2 and 3, but the angle where the release takes place is different. This provides a good feeling for the user.

The angular distance of the return movement of the tensioning member 14 between the end position in FIG. 3*c*, and the position where release of the drive member 30 is actuated, may for example be 20° to 60°, such as 30° to 50°, such as approximately 40°. Other angular distances are possible, depending on the implementation.

Figure 4:
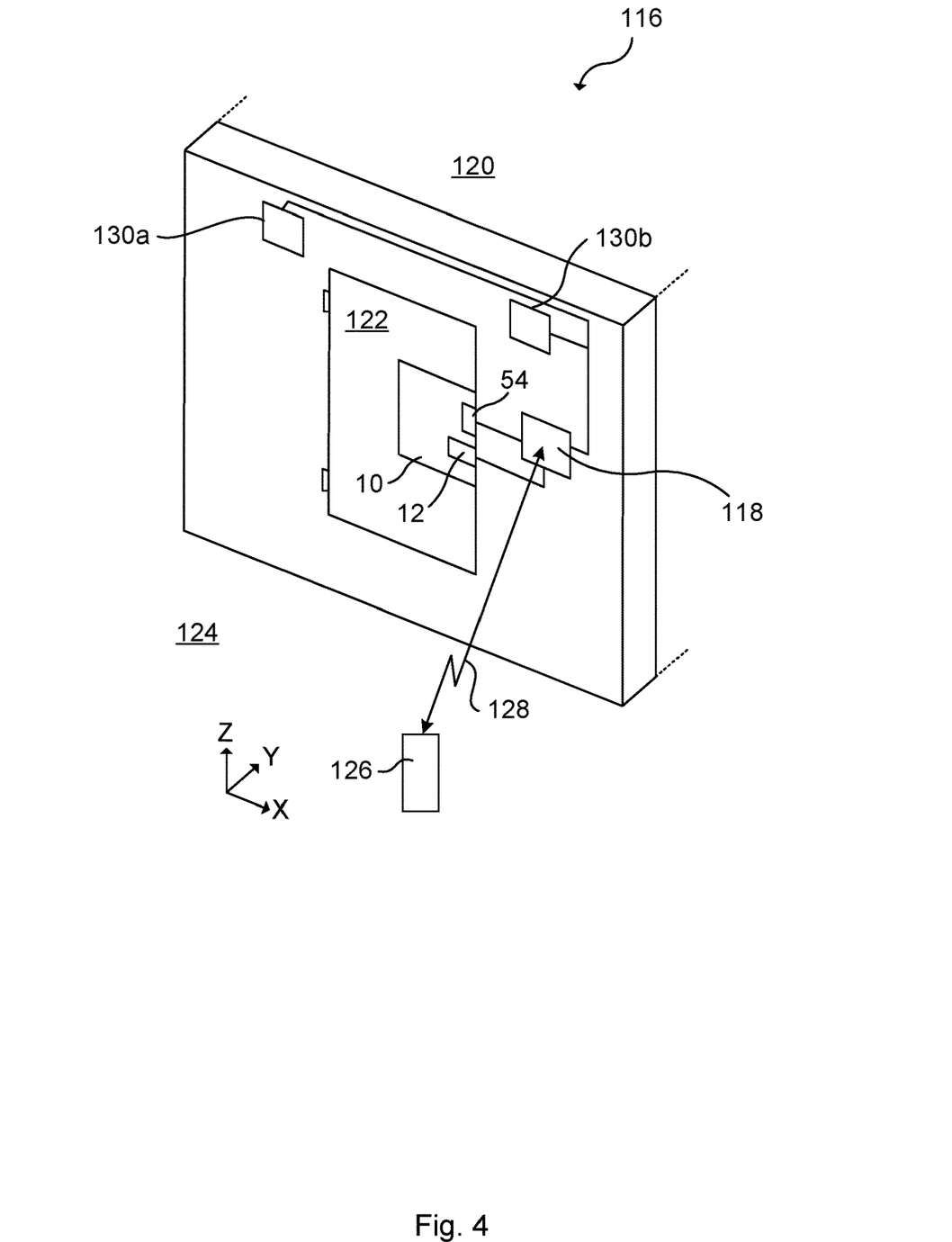
FIG. 4: schematically represents an environment in which embodiments presented herein can be applied.

FIG. 4 schematically represents an environment in which embodiments presented herein can be applied. More specifically, FIG. 4 shows an electronic locking system 116 comprising a lock device 10 and an energy harvesting arrangement 12 according to the present disclosure and an electronic access control device 118.

Access to a physical space 120 is restricted by a movable access member 122. The movable access member 122 is positioned between the restricted physical space 120 and an accessible physical space 124. Note that the accessible physical space 124 can be a restricted physical space in itself, but in relation to the access member 122, the accessible physical space 124 is accessible. The movable access member 132 can be a door, gate, hatch, cabinet door, mailbox door, drawer, window, etc.

The access control device 118 can be powered by the energy harvesting arrangement 12 of the lock device 10. The electronic access control device 118 is connected to the transfer device 56, which is controllable by the access control device 118 to be set in the locking state or in the unlocking state.

The access control device 118 communicates with a portable key device 126 over a wireless interface 128 using a plurality of antennas 130*a-b*. The portable key device 126 is any suitable device portable by a user and which can be used for authentication over the wireless interface 128. The portable key device 126 is typically carried or worn by the user and may be implemented as a mobile phone, smartphone, key fob, wearable device, smart phone case, RFID (Radio Frequency Identification) card, etc. In FIG. 4, two antennas 130*a-b* can be seen. However, only one antenna or more than two antennas may be provided in connection with the access control device 118. Using wireless communication, the authenticity and authority of the portable key device 126 can be checked in an access control procedure, e.g. using a challenge and response scheme, after which the access control device 118 grants or denies access.

When the access control procedure results in granted access, the access control device 118 sends an unlock signal to the transfer device 56, whereby the transfer device 56 is moved from the locking state to the unlocking state. In this embodiment, this can e.g. imply a signal over a wire-based communication, e.g. using a serial interface (e.g. RS485, RS232), Universal Serial Bus (USB), Ethernet, or even a simple electric connection (e.g. to the transfer device 56), or alternatively using a wireless interface.

When the transfer device 56 is in the unlocking state, the output member 20 can be rotated about the output rotational axis 24 by means of rotation of the input member 14 about the input rotational axis 18. By rotating the latch 22 connected to the output member 20 in this way, the access member 122 can be opened.

When the access control procedure results in denied access, the access control device 118 does not send an unlock signal to the transfer device 56. In this way, access to a restricted physical space 120 can be controlled by the access control device 118.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

What is claimed is:

1. A lock device comprising:
    a handle; and
    an energy harvesting arrangement for an electronic locking system, wherein the energy harvesting arrangement comprises:
        a driven member for driving an electric generator, the driven member being arranged to rotate about a driven member rotational axis;
        a drive member movable between a starting position, in which the drive member does not engage the driven member, and a releasing position, in which the drive member can drivingly engage the driven member;
        a harvesting elastic element arranged to force the drive member towards the starting position and arranged to store mechanical energy from displacement of the drive member from the starting position; and
        a release mechanism arranged to release mechanical energy stored in the harvesting elastic element to a returning movement of the drive member from the releasing position to the starting position;
    wherein the drive member is arranged to be moved from the starting position to the releasing position by manually turning the handle.

2. The lock device according to claim 1, wherein the drive member is rotationally movable about a drive member rotational axis between the starting position and the releasing position.

3. The lock device according to claim 2, wherein the drive member is constituted by a sector gear, or by a wheel comprising teeth along a sector and no teeth adjacent to the sector.

4. The lock device according to claim 1, wherein the drive member comprises drive teeth; and wherein the driven member comprises driven teeth for meshing with the drive teeth.

5. The lock device according to claim 4, wherein the energy harvesting arrangement further comprises a support device arranged to flexibly support the driven member between a meshing position, in which the driven teeth are positioned for meshing with the drive teeth, and a deflected position, in which the driven member is deflected away from the drive member, when a drive top land of the drive teeth contacts a driven top land of the driven teeth.

6. The lock device according to claim 5, wherein the energy harvesting arrangement is arranged such that a force from the drive member along a force line between the drive teeth and the driven teeth during the returning movement of the drive member generates a restoring moment or a restoring force on the support device towards the meshing position.

7. The lock device according to claim 5, wherein the support device comprises:
   a support member for rotationally supporting the driven member, the support member being movable between the meshing position and the deflected position; and
   a support elastic element arranged to force the support member towards the meshing position.

8. The lock device according to claim 7, wherein the support member is rotationally movable about a support member rotational axis between the meshing position and the deflected position.

9. The lock device according to claim 1, wherein the harvesting elastic element is preloaded in the starting position.

10. The lock device according to claim 1, wherein the energy harvesting arrangement further comprises the electric generator arranged to be driven by the driven member.

11. The lock device according to claim 1, wherein the energy harvesting arrangement further comprises a tensioning member and wherein the release mechanism is constituted by a hold and release mechanism arranged to hold the drive member in the releasing position and arranged to release mechanical energy stored in the harvesting elastic element to the returning movement of the drive member from the releasing position by being actuated by the tensioning member.

12. The lock device according to claim 11, wherein the hold and release mechanism comprises:
   a rocker arm rotationally movable about a rocker rotational axis between an extended position, in which the drive member can be held in the releasing position by the rocker arm, and a retracted position, in which the drive member is released from the releasing position; and
   a rocker elastic element arranged to force the rocker arm towards the extended position.

13. The lock device according to claim 12, wherein the drive member comprises a drive structure and wherein the tensioning member comprises:
   a drive structure engaging part arranged to engage the drive structure of the drive member to move the drive member from the starting position to the releasing position by movement of the tensioning member; and
   a rocker arm engaging part arranged to engage the rocker arm to move the rocker arm from the extended position to the retracted position.

14. The lock device according to claim 11, wherein the tensioning member and the hold and release mechanism are configured such that the drive member is positioned in the releasing position near the end of an outbound rotation of the tensioning member in a first direction and such that the tensioning member actuates the hold and release mechanism to release during a return rotation of the tensioning member in a second direction, opposite to the first direction.

15. An electronic locking system comprising a lock device according to claim 1.

* * * * *